April 4, 1950  F. BUDRECK  2,502,699
ANTIGLARE REAR-VISION MIRROR
Filed June 30, 1949  2 Sheets—Sheet 1
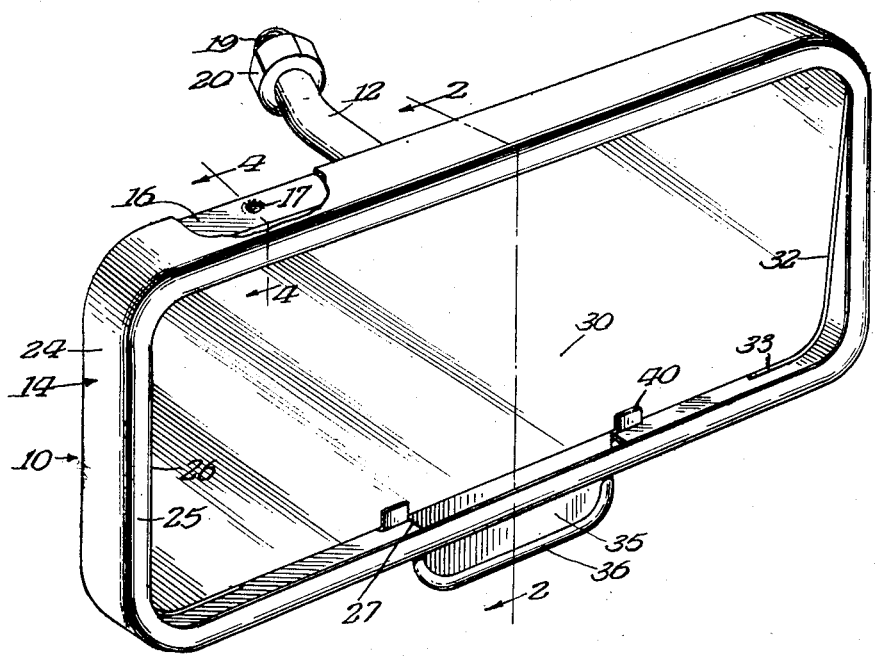
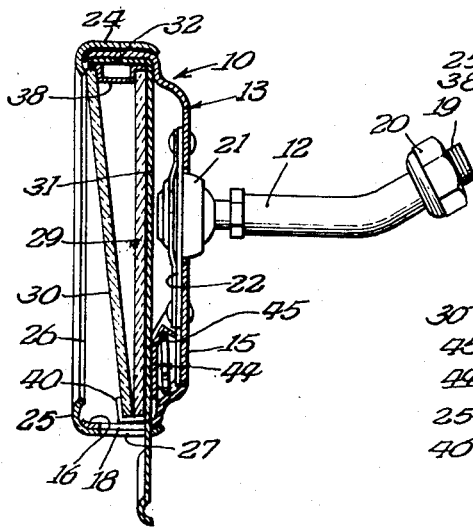
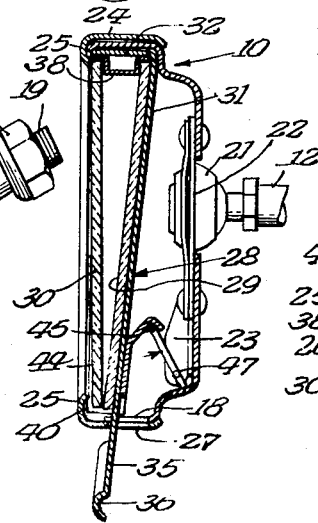
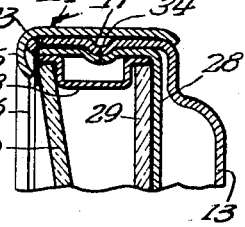
Inventor:
FRANCES BUDRECK
By: Thed Gerlach
Atty.

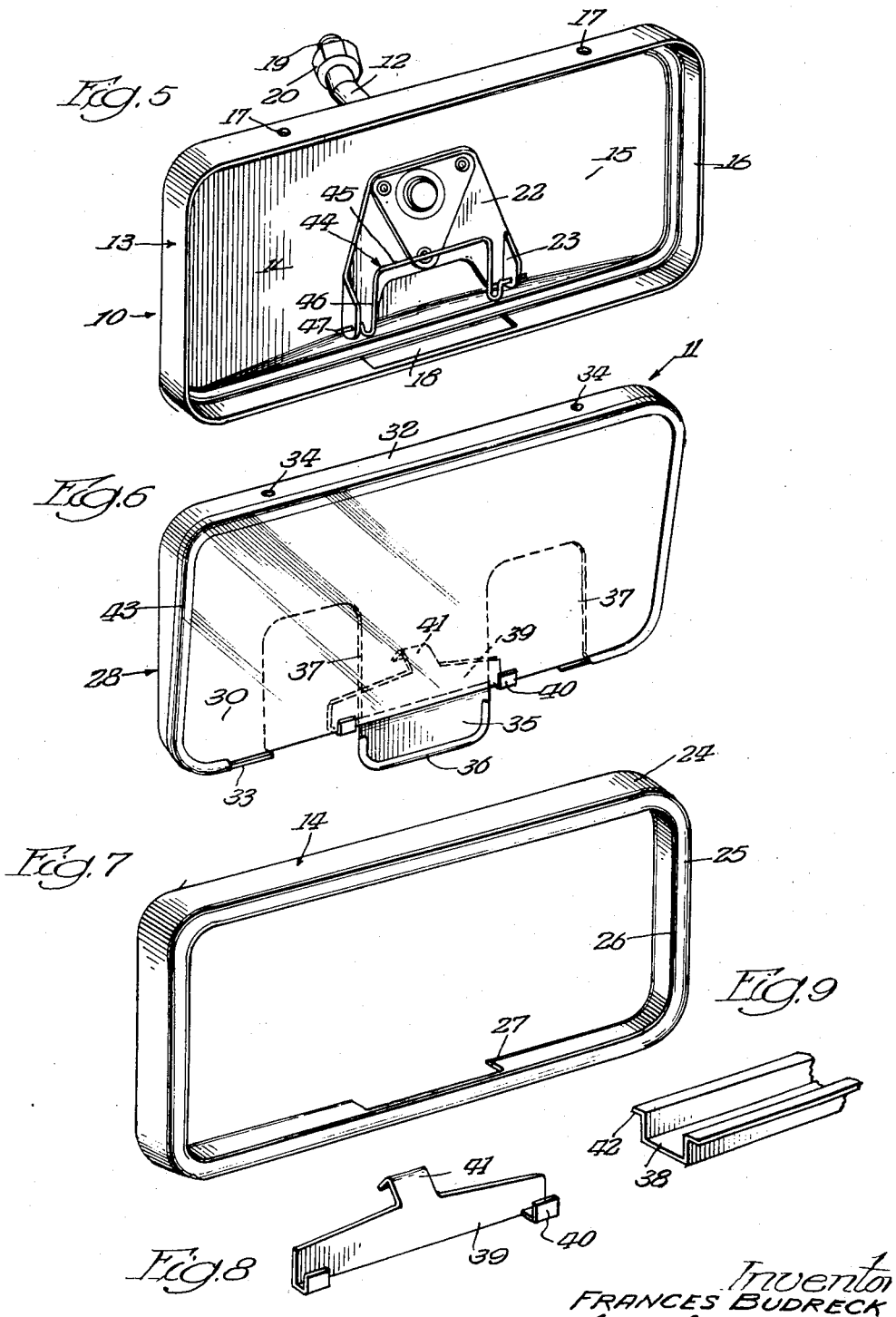

Patented Apr. 4, 1950

2,502,699

UNITED STATES PATENT OFFICE 2,502,699

ANTIGLARE REAR-VISION MIRROR

Frances Budreck, Chicago, Ill., assignor to Monarch Tool & Machinery Co., Chicago, Ill., a corporation of Illinois Application June 30, 1949, Serial No. 102,411

3 Claims. (Cl. 88—77)

The present invention relates generally to rear vision mirrors for use on vehicles, such as automobiles. More particularly the invention relates to that type of rear vision mirror which enables the user, by selective manipulation or adjustment thereof, to have complete or brilliant reflection under daylight driving conditions or non-glare reflection against following illuminated headlights during night time driving and its principal parts or components comprises: (1) a support with an adjustable bracket whereby it may be mounted in the proper position with respect to the driver's seat of the vehicle to which the mirror as a whole is applied; (2) a mirror structure which embodies angularly disposed reflecting surfaces of different power or intensity and is tiltably mounted on the support in such manner that when it is tilted in one direction one of the reflecting surfaces is brought into the line of vision of the user and when tilted in the opposite direction to a limited extent the other reflecting surface is brought into an operative position; (3) means for limiting tilting of the mirror structure to a predetermined acute angle relatively to the support; and (4) a spring arrangement for yieldingly retaining the mirror structure in either of its tilted positions.

One object of the invention is to provide a rear vision mirror of this type which is an improvement upon, and has certain inherent advantages over, previously designed mirrors of the same general character and is characterized by high efficiency, simplicity of design, and low cost of manufacture.

Another object of the invention is to provide a rear vision mirror of the type under consideration in which the support is in the form of a two-part box-like case which houses and protects the mirror structure and has at the front thereof a substantially full sized opening which exposes the mirror structure to the user and faces towards the rear of the vehicle, and the mirror structure is in the form of an assembly which consists of a substantially rectangular frame, a conventional mirror in the rear portion of the frame and a plain glass panel in the front portion of the frame and at a small acute angle with respect to the conventional mirror.

Another object of the invention is to provide a vehicle variety rear vision mirror of the last mentioned type and character in which the assembly constituting the mirror structure is characterized by the fact that the conventional mirror and the plain glass panel are supported by the assembly frame so that the lower edges are in abutment with one another and their upper edges are spaced apart and the frame has its upper portion in hinged or pivoted relation with the upper portion of the case.

Another object of the invention is to provide a rear vision mirror of the type and character under consideration in which the frame of the assembly constituting the mirror structure is provided at the lower margin thereof with an integral depending tongue which extends through a longitudinal slot in the bottom portion of the case, coacts with the slot defining portions of the case to limit back and forth tilting movement of the assembly relatively to the case and forms a handle whereby the user of the mirror proper may tilt the assembly back and forth in order to bring into the line of vision either the conventional mirror which affords complete or brilliant reflection or the plain glass panel which affords non-glare reflection in connection with night time driving.

Another object of the invention is to provide a rear vision mirror of the character under consideration in which the tiltably mounted assembly within the case has associated with it a one-piece stamped metal clip which is horizontally elongated, extends across the rear face of the handle forming tongue on the frame of the assembly and embodies at its ends upwardly extending hooks which extend around, and serve to hold together, the lower margins of the conventional mirror and the plain glass panel.

A further object of the invention is to provide a vehicle variety rear vision mirror of the aforementioned type and character in which the spring arrangement for yieldingly holding the assembly in either of its tilted positions consists of an inverted U-shaped wire, the lower ends of the side pieces of which are pivotally mounted and the central portion of the crosspiece of which is in interfitting relation with a downwardly facing hook on the central portion of the aforementioned clip.

A still further object of the invention is to provide a rear vision mirror which is generally of new and improved construction, embodies a novel arrangement of parts and is so constructed and designed that the various components or parts thereof may be assembled with facility.

Other objects of the invention and the various advantages and characteristics of the present rear vision mirror will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a front perspective of a vehicle rear vision mirror embodying the invention, the assembly constituting the mirror structure being shown tilted toward the back of the case in order to bring into the line of vision the conventional mirror having high reflecting power or value;

Figure 2 is a vertical transverse section taken on the line 2—2 of Figure 1 and illustrating in detail the arrangement of the parts;

Figure 3 is a similar vertical transverse section of the mirror except that it shows the assembly tilted toward the front of the case in order to bring into the line of vision the plain glass panel having low reflecting power or value;

Figure 4 is an enlarged vertical transverse section taken on the line 4—4 of Figure 1 and showing in detail one of the hinge connections between the upper portions of the assembly and the case in which the assembly is tiltably mounted;

Figure 5 is a front perspective of the rear part of the case illustrating in detail the construction, design and manner of mounting of the inverted U-shaped wire constituting the spring arrangement for yieldingly retaining the assembly in either of its tilted positions;

Figure 6 is a front perspective of the assembly that constitutes the mirror structure and consists of the frame, the conventional mirror and the plain glass panel in front of, and at a small acute angle to, the conventional mirror;

Figure 7 is a front perspective of the front part of the case;

Figure 8 is a perspective of the hook equipped clip which is associated with the assembly; and Figure 9 is a fragmentary perspective of the channel type spacer which is associated with the assembly and serves to hold the upper edges of the conventional mirror and the plain glass panel in proper spaced apart relation within the upper portion of the frame.

The rear vision mirror which is shown in the drawings constitutes the preferred form or embodiment of the invention. It is designed for use on a vehicle such as an automobile and serves in connection with selective manipulation or adjustment to afford the driver of the vehicle complete or full rearward vision during daylight driving or low power or non-glare rearward vision during night time driving. It is contemplated that the mirror as a whole will be positioned adjacent the upper portion of the windshield of the vehicle to which it is applied. As its main or principal components the mirror comprises a case 10 and an assembly 11 within the case.

The case 10 is of two-part design or construction and constitutes both a housing and a support for the assembly 11. It is provided with a mounting bracket 12 and consists of a rear part 13 and a front part 14. Generally speaking, the case is of box-like design or configuration and possesses but a small amount of depth. The rear part of the case is preferably in the form of a one-piece sheet metal stamping. It is horizontally elongated and consists of a substantially rectangular rear wall 15 and a continuous side wall 16. The side wall is formed integrally with, and projects forwards from, the margin of the rear wall 15, and defines with the latter an open front compartment. The open front of the compartment faces towards the rear of the vehicle to which the mirror as a whole is applied. The top portion of the side wall 16 of the rear part of the case is provided inwards of its ends with two down-struck hinge forming spherical bosses 17. The bottom portion of the continuous side wall 16 is provided in its central portion with a longitudinally extending slot 18. The mounting bracket 12 is in the form of an arm and has at its rear end a screw thread 19 and a nut 20 whereby it may be fixedly connected to the vehicle at a point adjacent the upper portion of the windshield. The rear end of the mounting bracket is connected to the central portion of the rear wall 15 of the rear part of the case 10 by a conventional universal joint 21. The latter permits the mirror as a whole to be tilted laterally or up and down into different angular positions and includes a plate 22. Such plate is riveted or otherwise fixedly secured to the front inner face of the rear wall 15 of the case rear part 13 and has at the lower corners thereof a pair of vertically extending and forwardly projecting lugs 23. Such lugs project towards the front of the case, i. e., toward the rear of the vehicle and are located above and slightly outwards of the longitudinally extending slot 18 in the bottom portion of the continuous side wall 16. The universal joint 21 permits the mirror as a whole to be adjusted so that it is in the range of vision of the driver or operator of the vehicle. The front part 14 of the two-part case 10, like the rear part 13, is preferably in the form of a one-piece sheet metal stamping. It consists of a continuous substantially rectangular side wall 24 and this closely surrounds, and corresponds in shape to, the continuous side wall 16 of the rear part 13. The front margin of the continuous side wall 24 is provided with an integral inwardly extending flange 25 which engages the front edge of the continuous side wall 16 of the rear part 13 and defines a substantially rectangular opening 26. Such opening is at the front of the case 10 and faces towards the rear of the vehicle. It exposes and provides access to the interior of the case 10. The rear margin of the side wall 24 is bent inwards into interlocked relation with the juncture of the rear wall 15 and the rear margin of the continuous side wall 16 in order to hold the front part 14 of the case in fixed relation with the rear part 13. The bottom portion of the continuous side wall 24 of the front part 14 is provided in the central portion thereof with an open sided slot 27. Such slot is the same in size as, and in registry with, the longitudinally extending slot 18 in the bottom portion of the continuous side wall 16 of the rear part 13.

The assembly 11 is disposed for the most part within the interior of the case 10 and consists of a substantially rectangular frame 28, a conventional mirror 29 and a plain glass panel 30. The frame 28 is preferably in the form of a one-piece sheet metal stamping and is shaped conformably to, but is of less size than, the interior of the case 10. It serves as a support or retainer for the conventional mirror 29 and the plain glass panel 30 and consists of a substantially rectangular rear wall 31 and an inverted U-shaped side wall 32. The side wall is formed integrally with, and projects forwards from, the top and side margins of the rear wall 31 and has at the lower ends of its side portions inwardly extending extensions 33. As best shown in Figure 6, such extensions are formed integrally with and project forwards from, the ends of the bottom margin of the rear wall 31 of the frame and form ledges on which rest the lower corners of the conventional mirror 29 and the plain glass panel 30. The side portions of the inverted U-shaped side wall 32 are downwardly tapered and the extensions 33 are of materially less width than the width of the top portion of the side wall 32. The top portion of the side wall 32 is provided inwards of its ends with two down-struck hemispherical sockets 34 which, as shown in Figure 4, receive the bosses 17 on the top portion of the side wall 16 of the rear part 13 of the case and form therewith hinge or pivotal connections at the upper portion of the assembly whereby the assembly may be tilted or swung forwards and rearwards relatively to the case 10. The central lower portion of the rear wall 31 of the assembly frame 28 is provided with an integral depending tongue 35 which extends downwards through the centrally disposed slot 18 in the bottom portion of the side wall 16 of the rear case part 13 and the centrally disposed slot 27 in the bottom portion of the side wall 24 of the front case part 25 and has a twofold purpose in that it coacts with the slot defining portions of the side walls 16 and 24 to limit or restrict back and forth tilting movement of the assembly with respect to the case and forms an exposed handle whereby the user of the mirror proper may effect frontward or backward tilting of the assembly. The lower edge of the tongue 35 is shaped to form a bead 36 in order to reenforce the tongue against bending. The portions of the rear wall 31 that are at the sides of the tongue 36 have open bottom cutouts 37. The conventional mirror 29 of the assembly 11 fits within the frame 28 and abuts directly against the front face of the rear wall 31. It may be of any desired construction but preferably consists of a glass panel having the rear surface thereof mirrored. The mirrored rear surface of the conventional mirror constitutes a full value or power reflecting surface which, when the assembly 11 is tilted forwards into the position shown in Figure 2, is brought into the line of vision of the user of the mirror as a whole and affords complete or brilliant rearward vision under daylight driving conditions. The lower corners of the conventional mirror 29 rest on the ledge forming extensions 33 of the side wall 32 of the assembly frame 11 and the upper edge of the conventional mirror is disposed directly beneath the top portion of the side wall 32. The plain glass panel 30 is disposed in front of, and is shaped conformably to, the conventional mirror 29. It has the lower corners thereof supported by the aforementioned ledge forming extensions 33. As best shown in Figures 2 and 3 the lower edge of the plain glass panel 30 is in abutment with the lower edge of the conventional mirror 29. The upper margins of the plain glass panel and the conventional mirror are spaced apart by an elongated channel shaped spacer 38 in order that the plain glass panel is disposed at a comparatively small acute angle with respect to the conventional mirror. The plain glass panel 30 constitutes a low power or value reflecting surface which is brought into play when the assembly 11 is tilted forwards, as shown in Figure 3, and affords the user of the mirror proper non-glare rearward vision against following illuminated headlights during night time driving of the vehicle. The lower edges of the conventional mirror and the plain glass panel are held in abutting or contacting relation with each other by way of a horizontally elongated clip 39 (see Figure 8). Such clip extends across the rear face of the handle forming tongue 35 and embodies at its ends a pair of integral upwardly and forwardly extending hooks 40. The latter are located at the sides of the tongue and in the cutouts 37 and extend around the lower margins of the conventional mirror 29 and the plain glass panel 30. The clip 39 is preferably in the form of a one-piece sheet metal stamping and embodies at its central portion a downwardly facing hook 41. The latter is disposed an appreciable distance above the hooks 40 and functions as described hereafter more in detail. The hooks 40 of the clip 39 slide with respect to the bottom portion of the side wall 24 of the front part 14 of the case in connection with back and forth tilting of the assembly 11 relatively to the case. In addition to holding the bottom edges of the conventional mirror and the plain glass panel in abutting relation the forwardly facing hooks 40 serve with the clip 39 to hold said mirror and panel in mounted or connected relation with the frame 28 of the assembly 11. The elongated channel shaped spacer 38 for spacing apart the upper margins of the conventional mirror 29 and the plain glass panel 30 is preferably in the form of a one-piece sheet metal stamping and consists of a crosspiece and upwardly extending side pieces along the side margins of the crosspiece. The side pieces abut against the upper margins of the conventional mirror and the plain glass panel and embody at their upper margins outwardly extending flanges 42 which rest on the upper edges of said mirror and panel. The front surface of the plain glass panel 30 is substantially flush with the front edge of the inverted U-shaped side wall 32 of the assembly frame 28 and said panel and side wall are held in sealed and connected relation by way of a strip 43 of transparent adhesive tape (see Figure 6).

In addition to the parts heretofore mentioned the mirror comprises a spring arrangement for yieldingly holding the assembly 11 in either of its tilted positions. This spring arrangement consists of an inverted U-shaped wire 44. The latter is located between the lower central portions of the rear wall 15 of the rear case member 13 and the rear wall 31 of the assembly frame 28 and embodies a crosspieec 45 and a pair of depending side pieces 46 at the ends of the crosspiece. The lower ends of the side pieces 46 are bent outwards to form trunnions 47 which are journalled in holes in the lugs 23 on the plate 22 in order that the wire is permitted to swing forwards and rearwards. The central portion of the crosspiece 45 of the inverted U-shaped wire 44 fits within, and is in hooked relation with, the downwardly facing hook 41 on the central portion of the clip 39, as shown in Figures 2 and 3. The wire 44 is so arranged that it assumes a dead center relation when the assembly 11 is midway between its forwardly and rearwardly tilted positions. When the assembly is initially tilted rearwards the inverted U-shaped wire 44, after being swung past its dead center position, automatically moves the assembly rearwards with a snap action and serves yieldingly to hold the assembly in its rearwardly tilted position as shown in Figure 2. Likewise when the assembly 11 is initially tilted forwards the inverted U-shaped wire, after passing its dead center position, automatically moves the assembly the balance of the way forwards with a snap action and yieldingly retains the assembly in its full forwardly tilted position, as shown in Figure 3. The wire 44 serves not only yieldingly to hold the assembly in either of its tilted positions, but also to urge the clip 39 upwards in order to maintain the upwardly facing hooks 40 in their operative position wherein they extend around the bottom margins of the conventional mirror 29 and the plain glass panel 30.

When the user of the mirror desires in connection with daytime driving to have full or complete rearward vision the assembly 11 is tilted rearwards into the position shown in Figure 2. This is accomplished by pressing rearwards the depending handle forming tongue 35 on the rear wall 31 of the assembly frame 28. As heretofore pointed out, after the assembly is tilted half way rearwards the inverted U-shaped wire 44 completes rearward tilting movement of the assembly with a snap action and holds the assembly in place. When the assembly is tilted rearwards the conventional mirror 29 is brought into the line of vision of the user. If in connection with night time driving it is desired to have nonglare reflection the assembly 11 is tilted forwards. This renders the conventional mirror 29 inoperative and brings into the line of vision the plain glass panel 30 which, as previously pointed out, has low reflecting value or power.

The mirror is assembled by first positioning the conventional mirror 29 against the front face of the rear wall 31 of the assembly frame 28. Thereafter the spacer 38 is manipulated into place and the plain glass panel 30 is properly positioned with respect to the assembly frame. After this operation the strip 43 of adhesive tape is applied. After application of the adhesive tape strip the clip 39 is shifted upwards so that it extends across the rear surface of the handle forming tongue 35 and the upwardly facing hooks 40 at the ends thereof extend around the lower margins of the conventional mirror and the plain glass panel. After completion of the assembly 11 the latter is inserted into the rear part 13 of the case 10 while the front part of the case is disconnected from the rear part. In connection with insertion of the assembly into the rear part 13 the handle forming tongue 35 on the lower central portion of the rear wall of the assembly frame 28 is inserted through the slots 18 and 27. In connection with insertion of the assembly into place the central portion of the crosspiece 45 of the inverted U-shaped wire 44 is automatically brought into interfitting relation with the downwardly facing hook 41 on the central portion of the clip 39. After proper positioning of the assembly the front part 14 of the case is slid rearwards onto the rear part and the rear margin of the side wall 24 of the front part 14 is bent inwards in order to secure the two parts of the case 10 in fixed relation. When the two parts of the case are connected together the opening 26 which is defined by the inwardly extending flange 25 exposes the assembly 11.

The herein described rear vision mirror effectively and efficiently fulfills its intended purpose and, due to its particular design and construction, may be assembled with facility and produced at a low cost. By reason of the fact that the mirror as a whole includes the two-part box-like case 10 the assembly 11 constituting the mirror structure with angularly disposed reflecting surfaces of different power or intensity is fully housed and protected against injury.

The invention is not to be understood as restricted to the details set forth since these may be modified within the scope of the appended claims without departing from the spirit and scope of the invention.

Having thus described the invention what I claim as new and desire to secure by Letters Patent is:

1. As a new article of manufacture, a rear vision mirror comprising a horizontally elongated box-like case provided with mounting means therefor, having a substantially full sized opening in its front, and embodying a continuous side wall with a longitudinal slot in its bottom portion; a substantially rectangular assembly disposed in, and extending lengthwise of, the case and consisting of a one-piece stamped metal frame in the form of a flat rear wall and an inverted U-shaped side wall connected to, and projecting forwards from, the top and side margins of the rear wall and having inwardly extending extensions on the lower ends of its side portions, a flat conventional mirror disposed in the rear portion of the frame and having its lower corners supported on the extensions, a flat plain glass panel positioned in the front portion of the frame, extending upwards and forwards at a small acute angle to the conventional mirror and having its lower corners supported on said extensions, and means associated with said plain glass panel to secure said panel and said mirror in their acute angular relationship, said assembly being arranged so that said conventional mirror and said panel are visible through the opening in the front of the case and having the top portion thereof in such pivotal relation with the top portion of the case that the assembly is capable of being tilted forwards into a position wherein the plain glass panel is in the line of vision and rearwards into a position wherein the conventional mirror is in the line of vision; and a depending tongue formed integrally with the central lower portion of the back wall of the frame, extending through the slot, coacting with the slot defining portion of the case side wall to limit tilting movement of the assembly relatively to the case to a predetermined angle, and forming an exteriorly disposed handle for effecting tilting of said assembly.

2. As a new article of manufacture, a rear vision mirror comprising a horizontally elongated box-like case having an opening in its front, provided with mounting means therefor, and embodying a rear wall with a pair of vertically extending laterally spaced forwardly projecting lugs at its lower portion and a continuous side wall connected to, and projecting forwards from, the margin of the rear wall and provided in its bottom portion with a longitudinal slot, a substantially rectangular mirror structure disposed longitudinally within the case and so that it is visible through the opening, having the top portion thereof in such pivoted relation with the top portion of the case that it is capable of tilting forwards and backwards, embodying a pair of reflecting surfaces of different reflecting power disposed at a small acute angle to one another, adapted when tilted forwards to have one of the reflecting surfaces brought into the line of vision and when tilted backwards to have its other reflecting surface brought into the line of vision having means associated with said pair of reflecting surfaces for securing the latter in their acute angular relationship, and provided at the back thereof with a downwardly facing hook, a tongue connected to, and projecting downwards from, the mirror structure, extending through the aforesaid slot, coacting with the slot defining portion of the case side wall to limit tilting movement of the mirror structure relatively to the case to a predetermined angle and forming an exteriorly disposed handle for effecting tilting of the mirror structure, and a dead center spring arrangement operative when the mirror structue is partially tilted into either position to complete tilting with a snap action, also operative yieldingly to hold the mirror structure in either of its fully tilted positions, and consisting of an inverted U-shaped spring wire disposed between the back wall of the case and the back of the mirror structure, having the lower ends of its side pieces bent outwards and journalled in holes in said lugs, and having its crosspiece interfitting with said downwardly facing hook.

3. As a new article of manufacture, a rear vision mirror comprising an elongated box-like case having an opening in its front, provided with mounting means therefor, embodying a rear wall with a pair of vertically extending, laterally spaced, forwardly projecting lugs at its lower portion, and a continuous side wall connected to, and extending forwards from, the margin of the rear wall and provided in its bottom portion with a longitudinal slot between and below the lugs; a substantially rectangular assembly disposed in, and extending lengthwise of, the case and consisting of a one-piece stamped metal frame in the form of a flat rear wall and an inverted U-shaped side wall connected to, and projecting forwards from, the top and side margins of the rear wall and having inwardly extending extensions on the lower ends of its side portions, a flat conventional mirror disposed in the rear portion of the frame and having its lower corners supported on the extensions, and a plain glass panel positioned in the front portion of the frame, having its lower edge in abutment with the lower edge of the conventional mirror, extending upwards and forwards at a small acute angle to said conventional mirror, and having its lower corners supported on said extensions, and means associated with said plain glass panel to secure said panel and said mirror in their acute angular relationship, said assembly being arranged so that said conventional mirror and said panel are visible through the opening in the front of the case and having the top portion thereof in such pivoted relation with the top portion of the case that the assembly is capable of being tilted forwards into a position wherein the plain glass panel is in the line of vision and rearwards into a position wherein the conventional mirror is in the line of vision; a tongue formed integrally with the central lower portion of the back wall of the frame, extending through the slot, coacting with the slot defining portion of the case side wall to limit tilting movement of the assembly relatively to the case to a predetermined angle and forming an exteriorly disposed handle for effecting tilting of said assembly; a horizontally elongated clip disposed within the case, extending across the rear face of the tongue and embodying at the ends thereof forwardly and upwardly facing hooks in hooked relation with the lower margins of the conventional mirror and the plain glass panel, and at its central portion a rearwardly and downwardly facing hook above the upwardly extending hooks; and a dead center spring arrangement disposed in the case between the rear walls of the case and frame, operative when the assembly is partially tilted into either position to complete tilting with a snap action, also operative yieldingly to hold the assembly in either of its fully tilted positions, and consisting of an inverted U-shaped spring wire having the lower ends of the side pieces thereof bent outwards and journalled in aligned holes in the lugs and the central portion of the crosspiece of said spring wire in interfitting relation with the downwardly facing hook on the clip.

FRANCES BUDRECK.

REFERENCES CITED

The following references are of record in the file of this patent:

UNITED STATES PATENTS

| Number | Name | Date |
|---|---|---|
| 2,455,818 | Sherts | Dec. 7, 1948 |
| 2,469,207 | Roedding | May 3, 1949 |